United States Patent Office 3,461,538
Patented Aug. 19, 1969

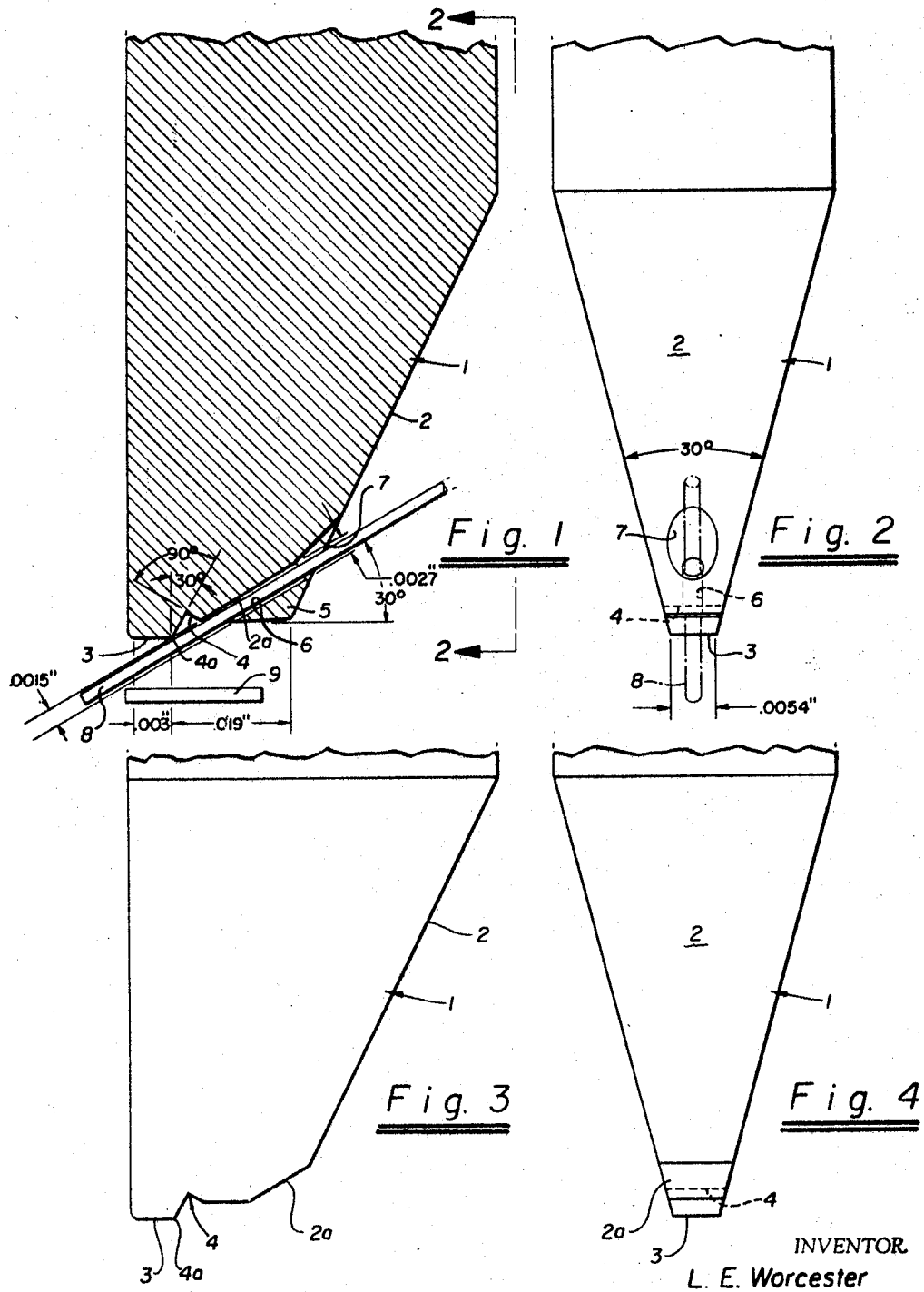

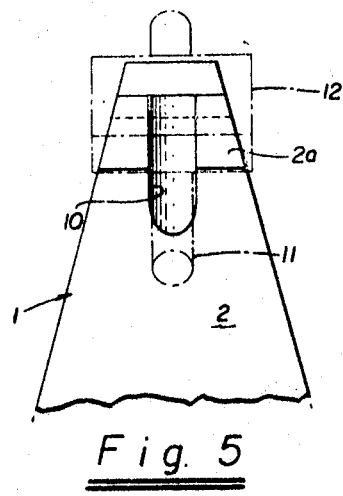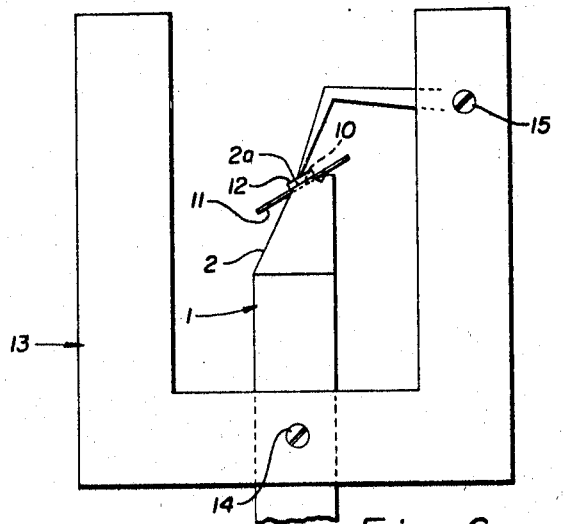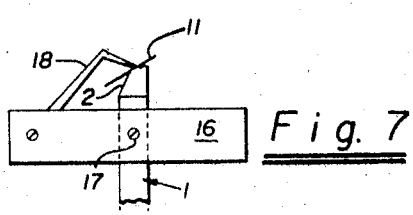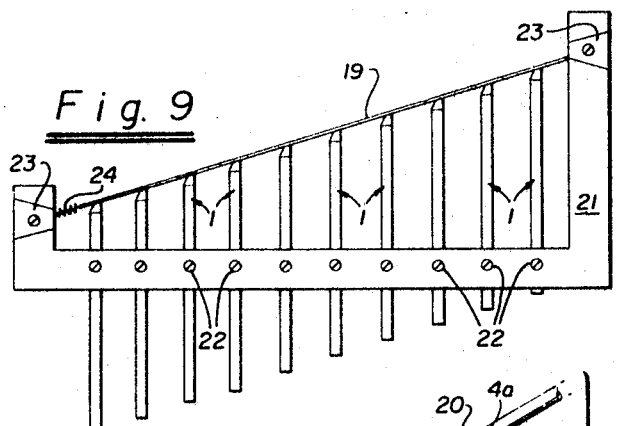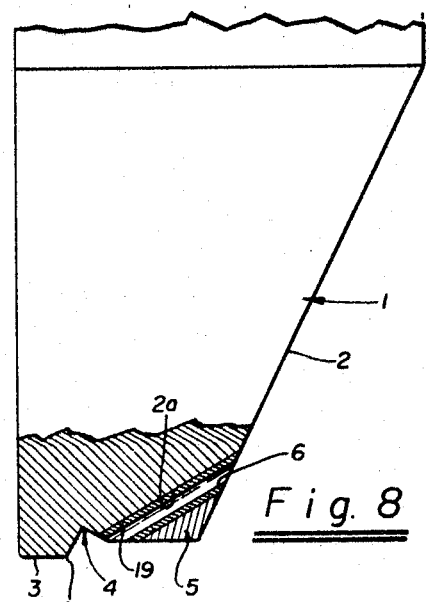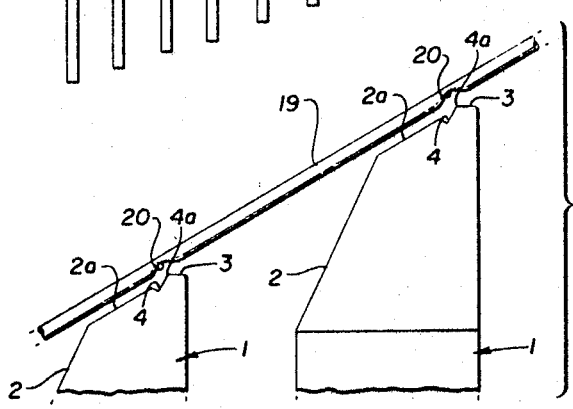

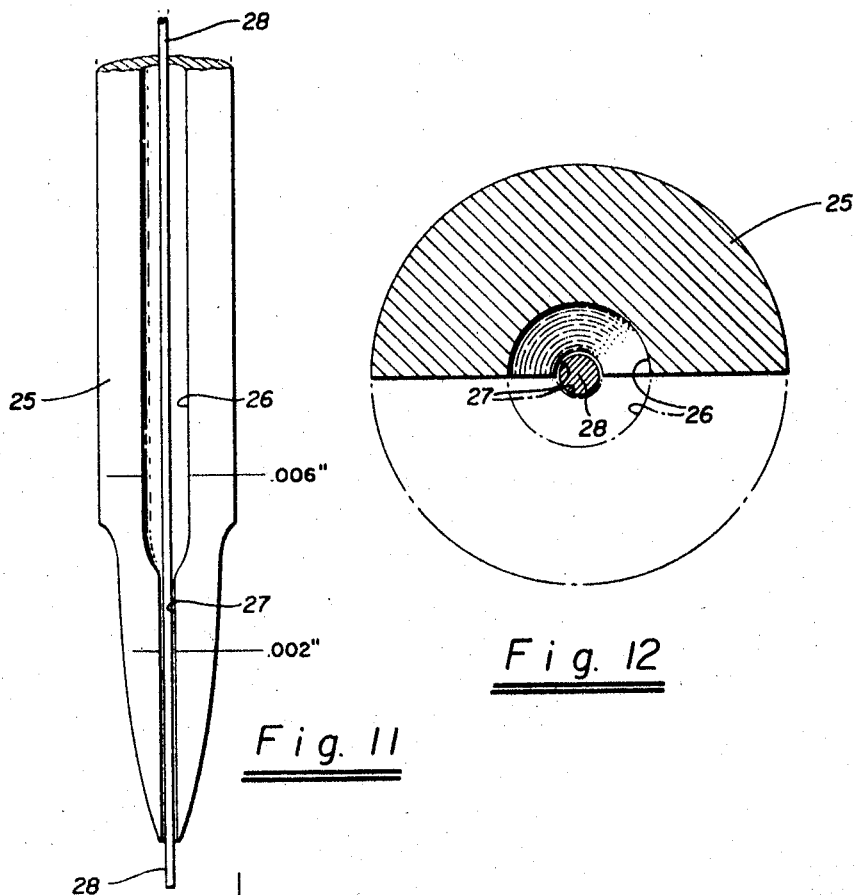
Fig. 11
Fig. 12
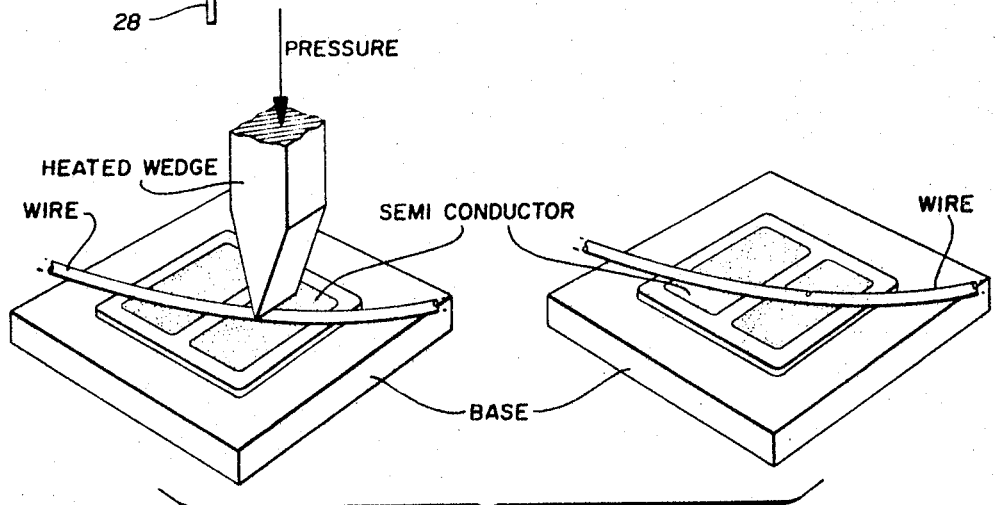
Fig. 13

3,461,538
PROCESS FOR MANUFACTURING WELDING
DEVICES FOR SEMI-CONDUCTORS
Leslie E. Worcester, Sunnyvale, and Lewis P. Webster, Mountain View, Calif., assignors to Diatron Pacific, a corporation of California
Filed Feb. 27, 1967, Ser. No. 623,499
Int. Cl. B23k 31/02, 35/12, 29/00
U.S. Cl. 29—423                                    11 Claims

ABSTRACT OF THE DISCLOSURE

Our invention relates to a process for the manufacture of welding devices as used in the micro-electronic industry, sometimes referred to as "molecular electronics." It covers devices used with machines for welding very fine wire conductors or leads made of such material as gold, silver or palladium onto the body of semi-conductors such as silicon or germanium by ultra-sonic or similar methods as widely applied in this industry.

These devices are used to feed and hold in position the very fine wire involved while it is being welded to the semi-conductor by the ultra-sonic or other method, and require great precision of manufacture in addition to the very small dimensions involved. Specifically, the invention discloses a process for providing a hole of very small diameter and substantial length through a very hard material such as tungsten carbide, efficiently and economically, but with great precision.

BACKGROUND OF INVENTION

In recent years the electronics industry has gone through phases of miniaturization or the production of electronic components, circuits, and assemblies of increasingly smaller and smaller dimensions. This development was made necessary by the requirements of such applications as mobile computers, desk calculators, portable receivers, and "walkie-talkie" sets. Later applications, which increased the importance of yet smaller dimensions, resulted in what is sometimes referred to as "microminiaturization," and was aided greatly by the development of semi-conductors and transistors. These have included medical devices, hearing aids, ordnance equipment, and aircraft and missile controls, and instrumentation, and so forth. This branch of the industry has come to be known as "micro-electronics" and the devices produced as "solid circuits."

The finished product in some of the above applications, such as an audio amplifier, has a greatest dimension of less than one quarter of an inch. The connecting wires for the semi-conductors usually have a diameter of the order of magnitude of 1 mil (.001"). The difficulty of properly and efficiently joining such a connecting wire to the semi-conductor base presented a problem of long standing, as should be evident to those skilled in the art. The processes which have been applied have included direct thermal joining of the material, combined heat and pressure, electro-deposition, and ultra-sonic welding. Regardless of the process used, it is essential that the very fine diameter wire be accurately fed to the semi-conductor and held precisely in the proper position while the joining process takes place. The latter may be performed by various types of machinery in a continuous and rapid manner.

For purposes of illustrating the prior art, reference may be had to FIG. 13 which shows a very thin semi-conductor wafer on a base with the connecting wire being joined to it by means of heat and pressure supplied by a wedge.

Glass needles of a capillary type in which the fine conductor is fed through concentrically in the needle and then held by it in position while the welding process progresses have been used. These, however, are very fragile and breakable and do not permit the application of higher temperatures. More recently tungsten carbide has been found to be a very acceptable material for manufacture of these devices. As pointed out above, the fine wire being joined must be fed through a very small hole in the course of the welding operation which necessitates that the device used in conjunction with the machine have such a small precision hole in it. While tungsten carbide is extremely satisfactory as a general material, it is also extremely difficult material in which to make any holes because of its extreme hardness.

Diamond drills have been used, but it is very difficult to obtain a drill of the required size and quality and the process is attended by high cost. The use of pre-sintered tungsten carbide around a central piece which may be chemically dissolved, or otherwise removed, has also been tried but has proved very costly.

Various epoxies and resins of many types have been tried as a housing for the required hole, but these did not provide a hole of the satisfactory smoothness and in general failed to stand up under ultra-sonic conditions.

This longstanding problem remained unsolved until our invention disclosed herein.

SUMMARY OF THE INVENTION

We have discovered a process whereby a hole may be made through the tungsten carbide holder or "wedge" as it is called in one well known embodiment, which overcomes all of the objections of the prior art and provides the necessary qualities for good performance. Generally our process comprises the steps of placing a very fine tube or wire of the proper dimensions against the appropriate surface of a tungsten carbide holder or wedge in the proper position. The tube or wire is then joined to the tungsten carbide material by brazing, silver soldering, or electro-deposition. If a tube is used it is composed of permanent material, such as stainless steel and is left in position and the device finish ground to the appropriate dimensions for final use. If a wire is used it is made of expendable material, such as aluminum, the latter is dissolved out by a strong caustic or similar solution, the resultant hole cleaned out, and then the device finally ground to finished dimensions as required. The detailed steps of the process will become apparent to those skilled in the art from the description and the drawings which follow.

DESCRIPTION OF THE DRAWINGS

FIG. 1 is a longitudinal section through a device manufactured by our process and showing also its principle of operation.

FIG. 2 is a partial side view of FIG. 1 along the lines 2—2.

FIG. 3 is a longitudinal side view of a blank forming the body of a device manufactured by the process of our invention.

FIG. 4 is a longitudinal end view of the blank of FIG. 3.

FIG. 5 is a diagram illustrating preliminary steps of our process.

FIG. 6 is a diagram illustrating a jig and the later steps of our process.

FIG. 7 is a diagram illustrating a jig and the later steps of an alternate method of the process of our invention.

FIG. 8 is a longitudinal side view of a blank illustrating steps in another alternate method of the process of our invention.

FIG. 9 is a diagram illustrating a jig and later steps of method of FIG. 8.

FIG. 10 is a diagram showing the steps of applying the tube in the method of FIG. 8.

FIG. 11 is a longitudinal section through a welding device of the capillary type showing another application of the process of our invention.

FIG. 12 is a view of FIG. 10 along the lines 11—11.

FIG. 13 is an isometric representation illustrating the general nature of a process in the prior art.

DESCRIPTION OF THE PREFERRED EMBODIMENTS

Referring now more specifically to FIGS. 1, 2, 3, and 4, there is seen the main body of the device 1 which may be fabricated from a tungsten carbide rod which may have an initial dimension of approximately 1/16 of an inch in diameter or 1/16 of an inch square and approximately 1 to 2 inches long, depending on the requirements of the machine in which it will naturally be eventually used. The upper end of the device is not shown in the drawings since this is not important to the present disclosure and will vary depending upon the type of machine in which it will be used. Starting with a rod as described above, the latter is precision ground to the shape and dimensions shown in FIGS. 3 and 4, although it is understood that these may vary somewhat depending on the specific application. As thus formed, the device takes on the shape of a wedge which accounts for the name to which it is often referred in the art. The important and critical parts of this shape are the upper tapered surface 2, the lower tapered surface 2a, and the flat wedge surface 3. Of critical importance is the notch 4 which is located and has the angular surfaces indicated.

For purpose of clarity, reference should now be had back again to FIG. 1 in which there is shown the section 5 forming part of the feed hole 6, having a tapered section 7. These are critical parts of the device and provide for feeding of the gold, silver, palladium or similar wire 8 down through hole 6 and holding against the semi-conductor base shown diagrammatically at 9, while the welding is in process. The sharp cutting edge 4a of notch 4 cuts the wire off at the end of the welding operation. On this figure also the dimensions shown are illustrative of one embodiment only and will vary with different applications.

Referring now more specifically to FIG. 5, there will be seen illustrated diagrammatically the preliminary steps in the process of our invention in order to produce the finished product shown in FIG. 1 and described above.

After the wedge 1 is formed into its preliminary shape of FIG. 3 described above, it is inserted in a precision mandrel and with a diamond cutting wheel of the desired size, a groove 10 is cut in the wedge along its lower tapered surface 2a. This groove will vary with the diameter of the final wire and may be of the order of magnitude of .001 inch to .005 inch in diameter. The wedge is then cleaned with nitric acid and inserted in a jig which is shown diagrammatically in FIG. 6. The general shape or body of the jig is U-shaped 13 and is equipped with a hole and set screw 14 and a spring actuated holder 15. In the next step the wedge 1 is inserted in the jig body 13 and held in position by means of set screw 14. A stainless steel chip, which may be approximately 1/16 of an inch square and 1/64 of an inch in thickness depending upon the size of the wedge for convenience, is then obtained. A piece of solid aluminum wire corresponding to the approximate dimension of the desired finished hole 6 is obtained and placed inside groove 10, which has been described previously above. The stainless steel chip is placed over the top of the aluminum wire 11 and a fine silver solder and flux is placed on the chip and around the probe tip. The entire jig assembly is then placed in a brazing oven and heated to approximately 1000° F. allowing the silver solder to flow freely and join with the body of the wedge, but not allowing the aluminum wire to melt. The tip, including the stainless steel chip and solder, are then precision ground down to dimensions shown in the drawings, FIG. 1 and FIG. 2. The entire wedge is then put in a 20 percent solution of sodium hydroxide and ultra-sonically cleaned by a cavitation process for approximately five minutes during which time the aluminum wire is dissolved out, leaving a clean hole 6. The final step is to ream out a taper section 7 by using an oversized drill, or by an alternative method which is described below.

A second alternate method or embodiment of our process is illustrated diagrammatically in FIG. 7. In this method the tungsten carbide wedge 1 is preliminarily prepared to the shape of FIG. 3, exactly as described in the previous method. With this method, however, the jig of FIG. 7 is used which comprises a straight flat body section 16 and a hole and set screw 17. The main wedge body 1 is inserted in the jig and secured by screw 17. In this method a similar aluminum rod is positioned against lower tapered surface 2a and held in position by means of spring actuated holder 18. No groove is cut in surface 2a as is done in the previous method. The entire assembly is then treated so it would accept electro-deposition and placed in a suitable cask adapted for electro-deposition and a deposit of copper, nickel or chromium is deposited over the aluminum wire and against the surface of the wedge. The wedge is then precision ground to final shape shown on FIG. 1 as described previously. The entire wedge is then put in a 20 percent solution of sodium hydroxide and ultra-sonically cleaned by cavitation process for a period of five minutes which dissolves out all of the aluminum wire and cleans out the hole, also as described previously. The final reaming of the taper section 7 is likewise performed as above.

Still another alternate method of the process of our invention is seen on FIGS. 8, 9, and 10. In this embodiment the initial precision grinding of the wedge 1 described above, is carried out so that an additional amount of metal is removed from the taper section 2a, as shown in FIG. 8 which may be in a specific instance the amount of two thousandths of an inch (.002"). The entire wedge is then cleaned with nitric acid as above. A jig of the type illustrated diagrammatically on 21 of FIG. 9 is then employed. This is a generally L-shaped configuration comprising a plurality of holes and set screws 22 and spring clamps 23. One of the clamps 23 is equipped with a tension spring 24. A length of stainless steel hypodermic tubing, which may have a wall thickness of .002 inch, and an inside diameter of .001 inch to .005 inch, is then positioned in an inclined manner between the clamps 23, as shown. Prior to being fastened in place, the tube 19 is crimped at intervals 20 at a point just over the sharp cutting edge 4a of notch 4 in each case. This is done for the primary purpose of permitting tube 19 to lie tightly against the tapered section 2a' of each one of the wedges 1 when they are inserted in the jig body 21 and fastened by means of set screws 22 as shown. The additional reason for crimping these is to prevent the solder, which is later used, from filling the inside of the tube. The wedges are then arranged so that the upper part of the tapered surfaces 2a would as described previously, leaving the hole 27, which is held taut by means of tension spring 24. This is best illustrated in FIG. 9, as well as FIG. 10. After being so positioned, a fine grade of commercial silver solder approximately 1/8 of an inch in diameter is placed on the tapered sections 2a of each wedge. The wedge is then heated in a suitable brazing oven to approximately 1000° F. to 1300° F. causing the stainless steel tubing to be soldered to the tubes. The wedges are then removed, separated, and precision ground to the dimensions shown in FIG. 1 as done previously. Final cleaning with a 20 percent solution of sodium hydroxide and final reaming of the taper holes are the same as previously described, except, of course, the tubes being of stainless steel are not dissolved in this case.

We have described the above methods comprising our process as applied to a device having a wedge shape. Our invention, however, is equally applicable to devices of the class described having a pointed or capillary configuration. These may be best seen in FIGS. 11 and 12. In this configuration the device resembles somewhat a ball-point pen in appearance. It comprises a body section 25 and a larger diameter axial hole 26 communicating with a smaller size axial hole 27. These holes may be the same order of magnitude as those described in the configuration of the wedge type above. The original shape is fabricated in two halves by precision grinding as previously, one-half being shown in cross-section in FIG. 12. Both halves are then given the thorough cleaning described previously, and the axial grooves cut in each half. Both halves are then again given the thorough cleaning described previously and the aluminum wire of the appropriate dimension is placed in one of the grooves, the two halves clamped together and joined by silver soldering or brazing as perviously described. The aluminum wire is then dissolved out and the entire assembly cleaned again as described previously, leaving the hole 27, which performs the same function as the hole 6 in the early embodiment.

With regard to the flared or tapered section 7, we may also fabricate this by subjecting one end of hole 6 to the action of a solution of a suitable dental abrasive, such as that manufactured by S. S. White & Company, and placing it in an ultra-sonic bath. The action of this bath may be so timed that any desired amount of material may be removed from one end of hole 6 to produce the tapered section 7 as desired.

While we have described preferred embodiments of our invention, other embodiments will now become evident to those skilled in the art and we do not limit ourselves to those described, except as we do so in the claims which follow.

We claim:
1. A process for the manufacture of a device for use in the fabrication of miniaturized semi-conductors comprising the steps:
   precision grinding a tungsten carbide blank to a predetermined shape and dimensions;
   grinding a groove across one predetermined surface of said blank;
   cleansing said blank with a commercial reagent;
   positioning a wire of predetermined diameter within said groove,
      said wire being composed of a material having a relatively high melting point and being readily soluble in a commercial solvent;
   covering said groove and said wire with a metallic strip;
   metallurgically bonding said strip to said surface of said blank thereby forming a solid assembly;
   precision grinding said assembly to a predetermined shape and dimensions;
   completely dissolving said wire in said commercial solvent and removing the solution so formed, thereby forming a hole through said assembly;
   forming an outwardly tapered section in one end of said hole.

2. The process of claim 1 in which said metallurgical bonding comprises soldering; said commercial reagent comprises a solution of nitric acid; said wire is composed of aluminum; said metallic strip is composed of stainless steel, and said commercial solvent comprises a solution of sodium hydroxide.

3. A process for the manufacture of a device for use in the fabrication of miniaturized semi-conductors comprising the steps:
   precision grinding a tungsten carbide blank to a predetermined shape and dimensions;
   cleansing said blank with a commercial reagent;
   positioning a wire of predetermined diameter across one predetermined surface of said blank;
      said wire being composed of a material having a relatively high melting point and being readily soluble in a commercial solvent;
   electro-depositing a metallic surface over said surface of said blank and said wire thereby forming a solid assembly;
   precision grinding said assembly to a predetermined shape and dimensions;
   completely dissolving said wire in said commercial solvent and removing the solution so formed, thereby forming a hole through said assembly;
   forming an outwardly tapered section in one end of said hole.

4. The process of claim 3 in which said commercial reagent comprises a solution of nitric acid; said wire is composed of aluminum; said metallic surface comprses an alloy of copper and nickel and said commercial solvent comprises a solution of sodium hydroxide.

5. The process of claim 3 in which said commercial reagent comprises a solution of nitric acid, said wire is composed of aluminum; said metallic surface comprises chromium and said commercial solvent comprises a solution of sodium hydroxide.

6. A process for the manufacture of a device for use in the fabrication of miniaturized semi-conductors comprising the steps:
   precision grinding a plurality of tungsten carbide blanks to predetermined shapes and dimensions;
   cleansing said blanks with a commercial reagent;
   crimping a length of tubing of predetermined internal and external diameter at predetermined points so as to close off its inside diameter;
      said tubing being composed of a material having a high resistivity to heat and corrosion;
   positioning said tubing across one predetermined surface of each of said blanks, while holding said blanks in alignment;
   metallurgically bonding said tubing to said surface of said blanks thereby forming a solid assembly of said blanks and said tubing;
   separating each of said blanks from said solid assembly at said predetermined points thereby forming a plurality of solid assemblies of blanks and tubes;
   precision grinding said assemblies to predetermined shapes and dimensions;
   cleansing said assemblies with a commercial reagent;
   forming an outwardly tapered section in one end of each tube in said assemblies.

7. The process of claim 6 in which said tube is composed of stainless steeel.

8. The process of claim 6 in which said metallurgical bonding comprises silver soldering.

9. A process for the manufacture of a device for use in the fabrication of miniaturized semi-conductors comprising the steps:
   precision grinding two tungsten carbide blanks to predetermined dimensions and having the general configuration of symmetrical semi-cylindrical sections tapered at one end;
   grinding a first groove of relatively small diameter axially along the center of each of said blanks at said tapered end;
   grinding a second groove of large diameter axially along the center of each of said blanks,
      said second groove communicating with said first groove and extending to the opposite end of said blanks;
   cleansing said blanks with a commercial reagent;
   positioning a wire of predetermined diameter within said grooves in one of said blanks,
      said wire being composed of a material having a relatively high melting point and being readily soluble in a commercial solvent;

metallurgically bonding said symmetrical sections together to form an assembly of generally cylindrical configuration;

completely dissolving said wire in said commercial solvent and removing the solution so formed, thereby forming an axial hole through said assembly,
   said hole having a larger diameter at one end than at the other;

forming an outwardly tapered section in said hole at said end having said large diameter.

10. The process of claim 9 in which said metallurgical bonding comprises soldering; said commercial reagent comprises a solution of nitric acid; said wire is composed of aluminum and said commercial solvent comprises a solution of sodium hydroxide.

11. The process of claim 9 in which said forming of said outwardly tapered section at said end comprises the steps:

immersing said end in a solution of dental abrasive;
subjecting said end to the action of ultrasonic vibrations for a predetermined interval of time.

References Cited

UNITED STATES PATENTS

| | | |
|---|---|---|
| 2,156,156 | 4/1939 | Mahlck. |
| 2,628,417 | 2/1953 | Peyches _____ 29—423 |
| 3,299,492 | 1/1967 | Sargent _____ 29—423 X |
| 3,372,464 | 3/1968 | Vincent et al. _____ 29—501 X |

JOHN F. CAMPBELL, Primary Examiner

J. L. CLINE, Assistant Examiner

U.S. Cl. X.R.

29—473.1, 501